United States Patent [19]

Kung

[11] Patent Number: 5,298,348

[45] Date of Patent: Mar. 29, 1994

[54] BATTERY SEPARATOR FOR NICKEL/METAL HYDRIDE BATTERIES

[75] Inventor: James K. Kung, Lexington, Mass.

[73] Assignee: W. R. Grace A& Co.-Conn., New York, N.Y.

[21] Appl. No.: 48,626

[22] Filed: Apr. 16, 1993

[51] Int. Cl.$^5$ .............................................. H01M 2/16
[52] U.S. Cl. ..................... 429/101; 429/251; 429/254
[58] Field of Search ............... 429/206, 101, 247, 249, 429/251, 254, 223; 428/105, 113, 280, 303

[56] References Cited

U.S. PATENT DOCUMENTS

| | | | |
|---|---|---|---|
| 2,812,379 | 11/1957 | Mendelsohn et al. | 136/143 |
| 2,930,829 | 3/1960 | Jacquier | 136/143 |
| 3,655,449 | 4/1972 | Yamamoto et al. | 136/107 |
| 3,915,750 | 10/1975 | Uetani et al. | 136/131 |
| 3,967,978 | 7/1976 | Honda et al. | 136/146 |
| 4,110,143 | 8/1978 | Cogliano et al. | 156/167 |
| 4,264,691 | 4/1981 | O'Rell et al. | 429/250 |
| 4,277,572 | 7/1981 | Fujiwara et al. | 525/61 |
| 4,330,602 | 5/1982 | O'Rell et al. | 429/206 |
| 4,361,632 | 11/1982 | Weber et al. | 429/145 |
| 4,734,344 | 3/1988 | Choi | 429/206 |

FOREIGN PATENT DOCUMENTS 58-32354  2/1983  Japan.

*Primary Examiner*—Anthony Skapars
*Attorney, Agent, or Firm*—John Dana Hubbard; William L. Baker

[57] ABSTRACT

A battery separator for nickel/metal hydride batteries is formed of a synthetic pulp, one or more nonwater swellable fibers and at least one water swellable polyvinyl alcohol fiber. The separator is impregnated with an acrylic resin binder. Alkali resistant fillers may also be included.

13 Claims, No Drawings

BATTERY SEPARATOR FOR NICKEL/METAL HYDRIDE BATTERIES

The present invention relates to a separator for alkaline batteries. More particularly, it relates to separators for nickel/metal hydride batteries.

BACKGROUND OF THE INVENTION

Alkaline batteries have become increasingly more popular because of their high energy density. As such, these batteries are increasingly used in applications normally reserved for the traditional lead-acid battery systems.

In order to achieve extended battery life and efficiency in alkaline systems, the use of battery separators is required and the use of battery interseparators, as well, is preferred. The battery separators are located between the positive and negative plates so as to provide, (1) a separation between the electrodes of opposite charge, (2) an electrolyte reservoir, (3) a uniform electrolyte distribution across the electrode surface so as to permit uniform current density and (4) a space for electrode expansion.

Battery separators and interseparators used in alkaline batteries at present are commonly formed of polypropylene, polyamide and/or nylon non-woven sheets.

Other separators in use in alkaline systems today are shown in U.S. Pat. Nos. 4,264,691 and 4,330,602. The separator/interseparator is formed of synthetic pulp, alkali resistant inorganic filler and a long fiber of polyester, polyacrylic, polyamide or polyolefin materials.

Until now, these separators have been suitable for nickel cadmium ("Nicad") batteries. However, a newer battery design is poised to supplant the Nicad battery as the rechargeable alkaline battery of choice. It is known as the nickel/metal hydride battery.

The nickel/metal hydride battery offers the potential of higher energy densities, longer life and the elimination of the use of cadmium, which is costly and has questionable environmental acceptability.

The nickel/metal hydride system requires a separator with better performance characteristics than is currently available with the current separators, especially those based upon nylon.

The present invention overcomes the problems inherent in the currently used separators and provides an inexpensive sheet material with the desired tensile strength, chemical inertness, thickness and wicking properties and which is particularly usable in nickel/metal hydride batteries.

OBJECTS OF THE INVENTION

It is an object of the present invention to provide a fibrous, sheet material useful as a separator or interseparator in alkaline batteries.

It is another object of the present invention to provide a sheet material having good tensile strength and chemical inertness.

Another object of the present invention is to Provide a separator suitable for use in alkaline battery systems comprised of synthetic pulp, a water swellable long fiber, preferably one or more a nonswellable fibers, and a resin binder.

An additional object of this invention is to provide a battery separator or interseparator comprised of synthetic pulp, one or more short fibers, a water swellable long fiber and a resin binder. The separator having excellent tensile strength, wicking properties and alkali resistance.

SUMMARY OF THE INVENTION

A sheet material suitable for use in alkaline battery systems as a battery separator or interseparator is described which is formed from a composition of from about 10 to about 20 percent polyolefin synthetic pulp, from about 80 to about 90 percent of one or more fibers selected from a first fiber formed of a water swellable homopolymer such as polyvinyl alcohol or a copolymer of polyvinyl chloride and polyvinyl alcohol, and optionally, a second fiber selected from a non-water swellable polymer such as polyvinyl alcohol, polyester, polyamide, polyolefin, polyacrylic, a bicomponent of two polyolefins or mixtures thereof.

DETAILED DESCRIPTION OF THE INVENTION

All measurements stated in percent in this application, unless otherwise stated, are measured by weight based upon 100% of the finished product weight. Thus, for example 30% represents 30 weight parts out of every 100 weight parts of the finished product.

The present invention is a sheet material, such as a separator or interseparator for nickel/metal hydride batteries, comprising a mixture of from about 10 to about 20 percent polyolefin synthetic pulp, from about 80 to about 90 percent of one or more fibers, wherein some of the fibers are water swellable, and from about 0.0001 to 1 percent by weight of the sheet of resin binder.

The synthetic pulp useful in the present invention is a polyolefin of short fibers having a fiber size and shape similar to that of cellulose pulp. Such synthetic pulps are described in U.S. Pat. Nos. 4,264,691 and 4,330,602, the teachings of which are incorporated herein by reference.

The length of the synthetic pulp is preferably from about 1 to 4 millimeters. The preferred pulp is a polyethylene based pulp. Other pulps are equally useful and may be made of other polyolefins such as polypropylene. Pulp fibers with a high degree of branching or fibrillation are most preferred in the present invention.

The one or more fibers used in the present invention are formed of synthetic polymers, at least some or all of which are water swellable. The present invention may contain only one fiber which is water swellable. Preferably, the invention contains at least two types of fibers; one water swellable, and at least one other being non-water swellable. The water swellable fiber is formed of a material such as a vinyl alcohol polymer (PVA) or a copolymer of a polyvinyl chloride (PVC) and a polyvinyl alcohol or a grafted copolymer comprising a vinyl chloride backbone grafted with a vinyl alcohol Polymer. Such fibers are commercially available. A commercially available example of a vinyl alcohol polymer water swellable fiber is MEWLON SML by Unitika Kasei, Ltd. An example of a commercially available polyvinyl chloride/polymer alcohol copolymer is sold by Kohjin Co. Preferably, this fiber is a "long" fiber having a length of from about 5 to 38 millimeters (0.25 to 1.5 inches).

The second fiber(s) can be preferably a nonwater swellable PVA, such as MEWLON F, by Unitika Kasei, Ltd., as well as other nonwater swellable fibers such as polyester, polyacrylic, polyamide, polyolefin, bicomponent fibers or mixtures thereof.

Preferably, the second fiber component is a blend of several different fibers. Typically, a blend of polypropylene, polyethylene, nonwater swellable PVA and a bicomponent fiber are used. Such fibers are well known and commercially available.

By "bicomponent" it is meant a fiber which has core formed of one polymer and an outer sheath, jacket or coating formed of a different polymer. Typically, the outer layer is formed of a polymer having a lower melting point than the polymer of the core.

A preferred bicomponent fiber is based upon a Polypropylene core covered a polyethylene jacket. Such fibers are sold by DIAWABO Co. Ltd. of Japan and are known as the DIAWABO NBF fibers. Other suppliers are also available and known to those skilled in the art.

The second fiber(s) should have a denier of from about 1 to about 12 and a length of 3 to 10 millimeters. The total amount of second fiber(s) should constitute from 80 to 90% of the sheet material.

The resin binder which is used to impregnate or saturate the fibrous sheet is preferably a water based acrylic resin. One preferred acrylic resin is known as CARBOPOL and is sold by B. F. Goodrich. It is an acrylic acid homopolymer, typically of high molecular weight. The preferred acrylic acid homopolymer used in the present invention should have a molecular weight (average) of about 400,000.

The resin should be dissolvable in water. To prepare the resin, such as the CARBOPOL resin, for use in the invention, one dilutes or dissolves the resin in water and raises the pH of the solution to about 7 or 8 through the addition of potassium hydroxide.

The amount of resin which is present in the sheet, after impregnation and drying, varies from about 0.0001 to about 1% by weight of the sheet. This small amount has been shown to provide good binding properties, allowing the sheet to be flexible and formstable. Moreover, the addition of a small amount of resin binder improved the wetting ability of the sheet (e.g. ability to quickly and completely absorb electrolyte).

Optionally, an inorganic alkali resistant filler may be used in the present invention.

The alkali resistant inorganic filler can be any particulate material which is chemically inert to alkaline electrolytes. Alkali resistant inorganic fillers suitable for use in the present invention include for example, titanium dioxide, alumina, calcium oxide, calcium hydroxide, calcium titanate, potassium titanate, magnesium hydroxide, magnesium oxide or zirconium hydroxide and admixtures thereof. Of course, any other alkali resistant filler, which is compatible with the other ingredients used in the sheet of the present invention and known to one skilled in the art can be used as well. A preferred filler is potassium titanate. Another preferred filler is titanium dioxide. The filler preferably has a particle size of from about 0.001 to about 1 microns, a surface area of from about 5 to about 200 square meters per gram and a pore volume of from about 0.01 to about 1 cc per gram when present, the filler should be in an amount from 5 to 100 weight percent of the fibers in the separator.

Sheet material formed in accordance with the present invention are porous materials having a median pore diameter of less than 10 microns and a maximum pore diameter of no more than about 90 microns. Additionally, it may have a ream weight of from about 15 to 60 pounds, porosity of from about 50 to 90%, an electrolyte retention capability of from 200 to 700% and an electrical resistance of less than 5 ohms/cm.

The process by which the sheet of the present invention is formed is similar to that described in U.S. Pat. Nos. 4,264,691 and 4,330,602 which are incorporated by reference herein. The process is carried out on normal paper-making machinery, such as a rotoformer or Fourdinier paper machine. A slurry is formed in a conventional paper-making pulper first by charging the synthetic pulp with water and pulping the material until it is thoroughly dispersed. Various dispersants may be added if necessary or desired, or more preferably the pulp may optionally contain a dispersant. The pulper content is then discharged into the chest of a rotoformer or a Fourdinier paper machine. A water swellable long fiber is added to the chest and mixed for a sufficient amount of time so as to allow the fiber to swell. Preferably, the slurry is warmed to room temperature or greater to aid in the swelling of the fiber. Next one or more nonwater swellable fibers are mixed into the chest. After thoroughly mixing the components in the chest, ground alum, (aluminum sulphate) preferably iron free, is added. The aqueous slurry is then transferred from the chest to a dilution box upstream of a web forming headbox. There, the mixture is diluted with water until the solids concentration is less than 5 percent preferably less than 1 percent. The mixture is then transferred to the headbox and a web is formed on the rotoformer or Fourdinier machine. A lump breaker operating at 20 to 80 psi. smooths the upper surface of the web. The web is transferred from the rotoformer or Fourdinier machine to an oven and/or one or more drying cans where the web is dried. During the drying or subsequent thereto, the web may optionally be heated to a temperature of from about 125° C. to 150° C. to allow for the partial fusing of the synthetic pulp fibers.

The thickness of the resultant web is directly related to the rate at which the slurry is deposited onto the web forming apparatus, the solids concentration at that moment and the speed of the web forming apparatus. The sheet material should have a thickness of less than 20 mils. Preferably the resultant sheet material should be less than 12 mils, requiring therefore that the deposition of the slurry be at a grammage of less than about 120 grams per square meter ($gm/m^2$), preferably 50 to 120 $gm/m^2$. Of course, should a thicker sheet material be desired, one could easily increase the deposition grammage until a sheet of desired thickness is achieved.

The dried web may be calendered at sufficient pressure and temperature to form a sheet having a thickness of less than 12 mils, preferably 5 to 10 mils.

The use of a retention aid is not required in the present invention as it has been found that the water swellable long fiber attracts and retains any filler, if used, to its surface so that the amount of filler lost during drying is substantially reduced. One could use retention aids in the process to further reduce the loss of filler during drying. If used, preferably the slurry is treated with an ionic retention aid such as a cationic polyacrylamide and then an anionic polyacrylamide retention aid. An example of a cationic acrylamide useful in this invention is RETEN 210, a product of Hercules, Inc. A suitable anionic retention aid is RETEN 421 or 521, an anionic acrylamide copolymer of Hercules, Inc. Typical concentrations are 0.04% in water at 600 to 800 ml/minute for the cationic retention aid and 0.025% in water at 600 to 800 mil/minute for the anionic retention aid.

Other aids, such as surfactants to improve the electrical resistance of the sheet material, and wetting agents are also usable in the present invention, so long as they do not have an adverse effect on battery performance or life.

After formation of the web, it is saturated or impregnated with the resin binder and then dried in an oven.

Alternatively, the resin can be applied after the web formation, but prior to drying by a sizing step. "Sizing" refers to the addition of a chemical to a paper during processing. The resin is simply sprayed or otherwise applied to web, preferably before calendaring in an amount sufficient to saturate the entire web.

The following example is provided to explain and more fully teach the present invention. It is not intended to restrict or limit the scope of the claims of the present invention.

EXAMPLE

A sheet according to the present invention was formed of the following components:
15% synthetic polyethylene pulp;
30% nonwater swellable polyvinyl alcohol fiber (1 dernier by 3 millimeters);
10% water swellable polyvinyl alcohol long fiber;
25% polypropylene fiber (average length 6 millimeters);
20% bicomponent fiber formed of a polypropylene core and polyethylene sheath, (2 dernier by 3 to 5 millimeter length). (all percentages by weight of the sheet)

The components were added to a wet laid paper making machine and formed into a sheet about 15 mils mm in thickness. The sheet was dried and then impregnated with an aqueous solution of CARBOPOL acrylic resin and dried. The amount of resin in the dried sheet was about 0.01% of the sheet weight.

The sheet was used as a separator in a nickel/metal hydride battery and was tested against a nickel/metal hydride battery using a microporous nylon separator. Both batteries were charged to capacity and then stored for 30 days after which their energy capacities were determined.

The control battery with the nylon separator retained 50% of its energy. The battery using the separator of the present invention retained better than 60% of its energy.

The present invention was shown to provide excellent separator properties and provided the battery with improved storage capabilities over the existing separators.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim:

1. A separator for a nickel/metal hydride alkaline battery system comprising a sheet formed of a first polyvinyl alcohol fiber which is water swellable, a second polyvinyl alcohol fiber which is not water swellable and at least one other fiber selected from the group consisting of polyethylene, nylon, acrylic, amides, polypropylene, bicomponent fibers and mixtures thereof, the sheet being formed as a synthetic paper and being saturated with an acrylic resin binder, present in an amount of from about 0.0001 to 1% by weight of the sheet.

2. The separator of claim 1 further comprising one or more alkali resistant inorganic fillers present in an amount from about 5 to about 65 percent by weight of the sheet.

3. The separator of claim 1 wherein the water swellable polyvinyl alcohol fiber is at least about 0.25 inch in length.

4. The separator of claim 1 wherein all of the nonwater swellable fibers are of a length of from about 3 to about 10 millimeters.

5. The separator of claim 1 wherein the filter is selected from the group consisting of titanium dioxide, alumina, magnesia, potassium titanate, zirconium hydroxide, magnesium hydroxide and mixtures thereof.

6. A battery separator comprising a microporous sheet formed of:
(a). 15% by weight of the sheet of polyethylene pulp;
(b). 30% by weight of the sheet of a nonwater swellable polyvinyl alcohol fiber;
(c). 10% by weight of the sheet of a water swellable polyvinyl alcohol fiber;
(d). 25% by weight of the sheet of a polypropylene fiber;
(e). 20% by weight of the sheet of a bicomponent fiber formed of a polypropylene core and a polyethylene sheath; and
an acrylic resin binder impregnating the sheet and present in an amount of from about 0.0001 to about 1% by weight of the sheet.

7. The separator of claim 6 wherein the acrylic resin is formed of a high molecular weight acrylic acid homopolymer.

8. The separator of claim 1 wherein the sheet has a medium pore diameter of less than 10 microns, a maximum pore size of about 90 microns, ream weight of from 15 to 60 pounds, porosity of from 50 to 90%, an electrolyte retention capability of from 200 to 700% and an electrical resistance of less than 5 ohms/cm.

9. A battery separator for nickel/metal hydride batteries comprising: a microporous sheet formed of from about 10 to 20% of a polyolefin synthetic pulp, from about 25 to about 40% of a nonwater swellable polyvinyl alcohol fiber, from about 5 to about 15% of a water swellable polyvinyl alcohol fiber, from about 20 to about 30% of a polypropylene fiber and from about 15 to about 25% of a bicomponent fiber comprised of a polypropylene core and a polyethylene coating; wherein the sheet is impregnated with a resin binder, present in an amount of from 0.0001 to about 1% of the sheet, all percentages being by weight of the separator.

10. The separator of claim 9 wherein the pulp is a polyethylene fiber having a length of from 1 to 5 millimeters, the non water swellable polyvinyl alcohol fiber has a size of about 3 to 10 millimeters, the water swellable fiber has a size of from about 6 millimeters to 38 millimeters, the polypropylene fiber has a size of from about 3 to 10 millimeters and the bicomponent fiber has a size of from about 3 to about 10 millimeters.

11. The separator of claim 9 further comprising one or more alkali resistant fillers present in an amount from about 5 to about 100 weight percent of the fiber components of the sheet.

12. The separator of claim 11 wherein the one or more fillers are selected from the group consisting of titanium dioxide, alumina, magnesia, potassium titanate, zirconium hydroxide, magnesium hydroxide, and a mixture thereof.

13. A nickel/metal hydride alkaline battery comprising a positive electrode negative electrode, an alkaline based electrolyte, and a separator between the positive and negative electrodes wherein the separator is formed of a sheet product according to claim 11.

* * * * *